July 26, 1949.  C. G. EWERTZ  2,477,445
METHOD OF AND APPARATUS FOR REMOVING
KERNELS FROM CORNCOBS
Filed July 6, 1945  2 Sheets-Sheet 1
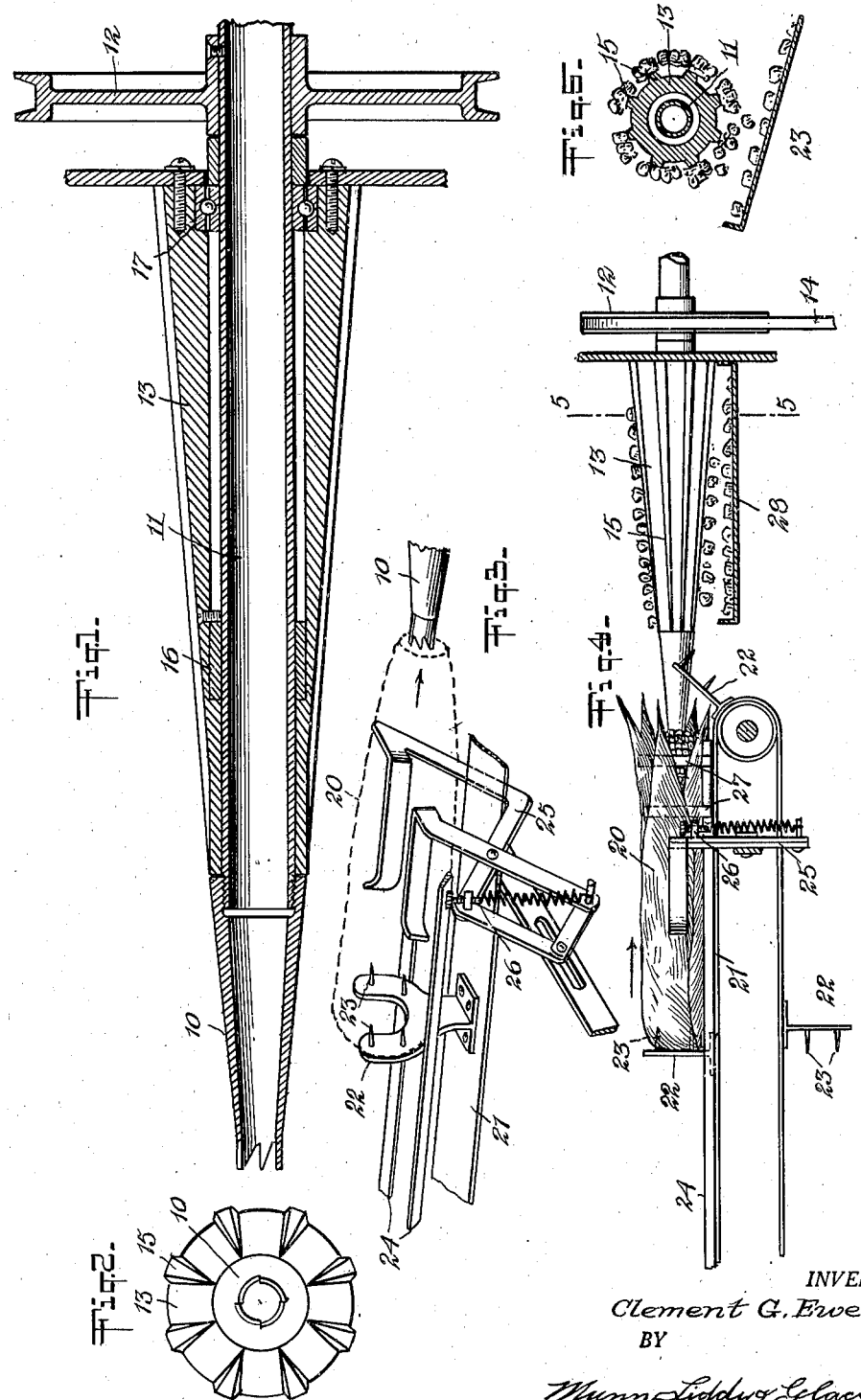
INVENTOR.
Clement G. Ewertz
BY
Munn Liddy & Glaccum
Attorneys

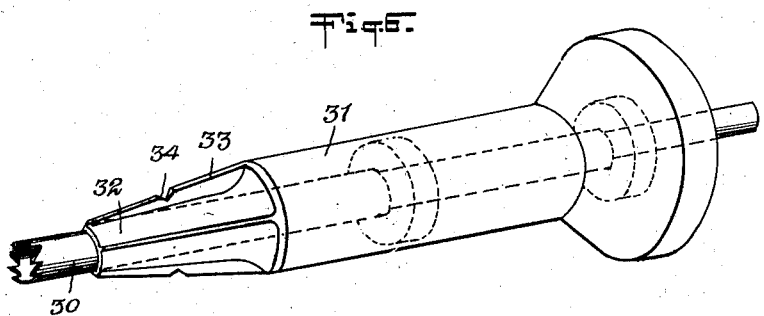
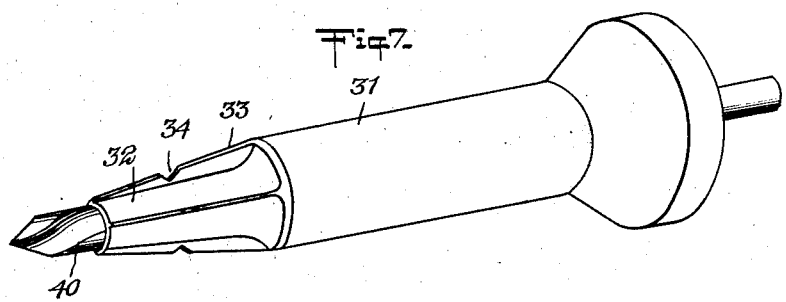
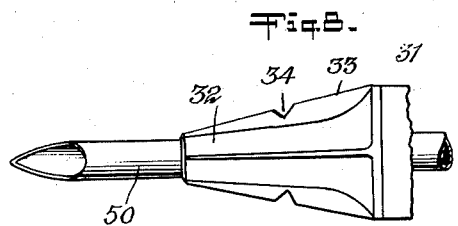

Patented July 26, 1949

2,477,445

UNITED STATES PATENT OFFICE 2,477,445

METHOD OF AND APPARATUS FOR REMOVING KERNELS FROM CORNCOBS

Clement G. Ewertz, Des Moines, Iowa

Application July 6, 1945, Serial No. 603,484

1 Claim. (Cl. 130—8)

The present invention relates to a method of and an apparatus for removing the kernels from corn cobs without injuring the kernels.

In the seed corn industry, it is most important that the kernels of corn are not injured in any way which might affect germination and also that the drying of the kernels to approximately 14% moisture content be as rapid as possible to avoid spoilage. It is also a well established fact that shelled corn dries much more rapidly than corn dried on the cob. However, with present methods of shelling, it is impossible to shell corn until the moisture content has been reduced to the requisite 14% or a maximum of 18% without injury to the kernels of corn and it is further true that many of the present shellers cause some damage to the kernels even after the corn has been dried to this moisture content. When the corn is picked with as high as 35% moisture content, it takes from sixty to ninety hours to dry the corn on the cob to the required 14% moisture content. It also takes considerable space and investment in buildings to provide drying bins for the ear corn when each bin must be tied up for this period of time, involving unnecessary maintenance, repair and invested capital.

In the light of these facts, the principal object of the present invention is to provide a method of removing the kernels from the corn without injuring the kernels in any way immediately after picking, and it is the further primary object of this invention to provide the apparatus for accomplishing this result.

The second object of the invention is to provide a method of and apparatus for the quick-drying of said corn. In accordance with this method and by means of this apparatus, the drying of corn takes no longer than fifteen hours at the very longest.

These objects are attained, broadly, by removing the pithy center of the corn cob and then breaking the remaining shell apart by means of an outwardly directed force exerted upon the inner wall thereof. This causes the shell to break up into small fragments, each carrying some of the kernels of the corn. These fragments, when put through a drying process, reduce the moisture content thereof much faster than when on the cob and when the moisture content has been sufficiently reduced, the kernels are separated from the fragments of cob and they are collected in the usual manner.

Preferred embodiments of the apparatus used in accordance with the present method are shown in the accompanying drawing in which—

Fig. 1 is a longitudinal section through one of the corn center removing devices;

Fig. 2 is a front view thereof;

Fig. 3 is a perspective view of the conveying apparatus which brings the ear of corn into operative position with respect to the device shown in Fig. 1;

Fig. 4 is a side view of the apparatus in Fig. 3 in the device in Fig. 1 showing the apparatus in the device in operative position with respect to each other;

Fig. 5 is a section on the line 5—5 of Fig. 4 showing how the shell is broken apart and the fragments collected;

Fig. 6 is a perspective view of a second form of the device shown in Fig. 1;

Fig. 7 is a perspective view of a third form of the device shown in Fig. 1; and

Fig. 8 is a fragmentary side view of a fourth form of device shown in Fig. 1.

Referring now to Fig. 1, the device comprises a rotatable hollow tube cutter or cylindrical saw 10 affixed to a shaft 11 to which is affixed a pulley 12. Shaft 11 is rotatably mounted within a hollow expander 13. The pulley 12 is connected to a suitable source of motive power by means of a pulley belt 14 shown in Fig. 4. It will be noted in Figs. 1, 2 and 4 that the expander 13 is provided with a plurality of longitudinal ridges 15 arranged radially thereof. It will also be noted that cutting member 10 and expander 13 each comprises a truncated cone and that the base of the cutter 10 lies adjacent the smaller end of the expander 10 so that the two together comprise a modified form of truncated cone. Bearings 16 and 17 mounted within the expander 13 provide a relatively frictionless carriage for the shaft 11. The cutting member 10 is removably screwed to the shaft 11 so that different cutting units 10 of different dimensions or different types of cutting units may be mounted on the same shaft 11.

Reference to Figs. 3 and 4 will show that the ear of corn 20 is carried on an endless conveyor belt 21 into operative position with respect to the tool shown in Fig. 1. Affixed to the belt 21 is a plurality of brackets 22 which serve as pushers for the corn, pushing the same as aforesaid into operative position. These brackets are provided on their forward sides with sharp prongs 23 which pierce the cob of the corn and hold the same in non-rotatable position. A pair of spaced longitudinally fixed skid tracks 24 mounted slightly above and parallel to the belt 21 assist in positioning the ear of corn as do a centering device 25 which is provided with a spring tension control 26. A pair of scrapers 27 are fixed on each side of the conveyor system above described for the purpose of husking the corn. This is accomplished when the scrapers frictionally engage the husk and the ear of corn is forced between them. Reference to Fig. 4 will also show that a sloping conveyor 28 is disposed below the tool shown in Fig. 1 all for the purpose that will hereinafter appear.

The apparatus may be used as follows:

The ears of corn are loaded onto the conveyor belt in the usual manner. The pronged brackets 22 engage each ear of corn and push it along the skids 24 between the centering device 25 and between the husking fingers 27. As the ear of corn is moved along, the husking process takes place by the simple expedient of the husking fingers frictionally engaging the husk and dragging it off the cob of corn. The cob of corn is now brought endwise into contact with the cutting member 10. This member functions as any cylindrical saw would normally function and cuts the core out of the cob, the core passing through said cutting unit and out through the hollow shaft 11. As this is being done (the cob of corn all the while moving in the direction of the cutting element 10 as indicated by the arrow in Fig. 4), the shell of the cob which remains is pushed up onto the cutting member 10 and the expander 13. Internal pressure against the inner wall of the shell mounts as the shell is brought higher and higher upon the expander and, finally, the shell is caused to burst into fragments as shown in Fig. 5. Each fragment carries the kernels which grew out of it. These fragments fall upon the conveyor 28 and are brought into the drier which normally comprises an oven. After a few hours, the fragments are dried sufficiently for the final step in the process. They are brought into a roller or plurality of rollers and the kernels are broken from the thin fragments of cob. The kernels are now collected in the usual manner. It may be said here that it is possible to separate the kernels from the fragments of cob in the manner described without injuring the kernels for the reason that the bond between them has been rendered brittle and tenuous by the drying process.

The second embodiment of tool shown in Fig. 1 is shown in Fig. 6 and comprises a hollow tubular cutter 30 having saw-tooth edges, said tubular cutting member being rotatably mounted within an expander 31. Unlike the cutting member shown in Fig. 1, cutter 30 is cylindrical in shape throughout. Unlike the expander in Fig. 1, the expander 31 is substantially cylindrical in shape except for its head or front end 32 which constitutes substantially a truncated cone having a plurality of longitudinally disposed radial ridges 33 formed thereon. These ridges 33 serve as splitting elements and are provided with saw-tooth notches 34 for added proficiency in the splitting operation.

The form of tool shown in Fig. 7 includes the same kind of expander 31 as the form shown in Fig. 6 has. In place of the cylindrical saw 30, however, it is provided with an auger or drill 40. The form of tool shown in Fig. 8 also includes the same kind of expanding member 31 as is shown in Figs. 6 and 7. In place, however, of the cylindrical saw 30 or the auger 40, this tool has a hollow tube corer 50. Units 30, 40 and 50 function in the same manner as cutting element 10 of the embodiment first above described except that member 10 serves also as an expander whereas units 30, 40 and 50 serve only to remove the center portion of the corn cob. Like cutting element 10, units 30 and 50 remove the core of the corn cob whole, said core passing through said units in the manner described with respect to the tool shown in Fig. 1. The cutting member 40, however, merely removes the core of the cob in the manner usual to augers and drills. In other words, it removes the core by shredding the same. In all other respects, the devices shown in Figs. 6, 7 and 8 are used in the same manner as the device shown in Fig. 1, to wit, in conjunction with the conveying and positioning apparatus shown in Figs. 3 and 4.

It may be seen from the foregoing that any type of coring tool may be used to remove the center of the cob for the purpose indicated. The tools above described are merely illustrative of coring tools in general which may be used to perform this function. It may also be seen from the foregoing that the coring tool itself may be provided with outwardly tapering outer walls as shown, for example, in Fig. 1 to endow the tool with the properties of an expanding unit. This type of tool not only removes the core of the cob, but also applies a wedging pressure against the inner wall of the resulting shell. This type of tool may be used alone or in conjunction with an expanding unit as is shown in Fig. 1. Many modifications, in addition to the foregoing, may be incorporated into the device as shown and described without departing from the basic principles of the invention.

I claim:

In the processing of corn, the method of removing the corn kernels from the corn cob without injuring the kernels, said method including the steps of removing the center of the cob leaving only a thin shell which carries the kernels, applying to the inner wall of said shell an outward force sufficient to cause said shell to burst into kernel carrying fragments, drying said fragments and the kernels thereon, and finally separating the dried kernels from the dried fragments by breaking the natural bond between them.

CLEMENT G. EWERTZ.

REFERENCES CITED

The following references are of record in the file of this patent:

UNITED STATES PATENTS

| Number | Name | Date |
| --- | --- | --- |
| 579,495 | Poindexter | Mar. 23, 1897 |
| 943,722 | Watkins | Dec. 21, 1909 |
| 1,037,382 | Wentworth | Sept. 3, 1912 |
| 1,191,588 | Groom | July 18, 1916 |
| 2,023,810 | Horner | Dec. 10, 1935 |
| 2,138,931 | Mirz | Dec. 6, 1938 |
| 2,207,258 | Kirby et al. | July 9, 1940 |
| 2,232,382 | Graze et al. | Feb. 18, 1941 |